US010406957B2

(12) United States Patent
Faruque et al.

(10) Patent No.: US 10,406,957 B2
(45) Date of Patent: Sep. 10, 2019

(54) HEAD RESTRAINT WITH HIDDEN STORAGE RECEPTACLES

(71) Applicant: Ford Global Technologies, LLC, Dearborn, MI (US)

(72) Inventors: Mohammad Omar Faruque, Ann Arbor, MI (US); S. M. Iskander Farooq, Novi, MI (US); Dean M Jaradi, Macomb, MI (US); Scott Holmes Dunham, Redford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 171 days.

(21) Appl. No.: 15/484,181

(22) Filed: Apr. 11, 2017

(65) Prior Publication Data

US 2018/0290573 A1    Oct. 11, 2018

(51) Int. Cl.
*B60N 2/879* (2018.01)
*B60N 2/90* (2018.01)
*B60N 2/809* (2018.01)
*B60N 2/80* (2018.01)
*B60R 7/04* (2006.01)

(52) U.S. Cl.
CPC ............ *B60N 2/879* (2018.02); *B60N 2/809* (2018.02); *B60N 2/90* (2018.02); *B60R 7/043* (2013.01); *B60N 2002/899* (2018.02); *B60N 2205/30* (2013.01)

(58) Field of Classification Search
CPC ........ B60N 2/879; B60N 2/803; B60N 2/806; B60N 2002/899; B60R 7/043
See application file for complete search history.

(56) References Cited

U.S. PATENT DOCUMENTS

| | | | | |
|---|---|---|---|---|
| 3,568,890 A | * | 3/1971 | Leachman | B60N 2/879 222/183 |
| 3,596,987 A | * | 8/1971 | Wilson | B60N 3/004 297/188.07 |
| 3,615,118 A | * | 10/1971 | Buxton | B60N 3/004 297/188.07 |
| 6,215,518 B1 | * | 4/2001 | Watkins | B60R 11/02 348/148 |
| 6,394,551 B1 | | 5/2002 | Beukema | |
| 6,739,654 B1 | | 5/2004 | Shen et al. | |
| 7,048,163 B2 | * | 5/2006 | Albert | A45C 11/24 224/275 |
| 7,070,237 B2 | | 7/2006 | Rochel | |
| 7,188,896 B2 | * | 3/2007 | Embach | B60R 7/043 297/217.4 |

(Continued)

FOREIGN PATENT DOCUMENTS

DE    3637772 A1    5/1988
KR    100338463 B1    5/2002

*Primary Examiner* — David R Dunn
*Assistant Examiner* — Tania Abraham
(74) *Attorney, Agent, or Firm* — Vichit Chea; Price Heneveld LLP

(57) ABSTRACT

A head restraint for a seating assembly of a vehicle comprising: an exterior surface; one or more interior wall surfaces disposed beneath the exterior surface forming an internal receptacle; an opening into the internal receptacle; the internal receptacle comprising a bottom; and the one or more interior wall surfaces are configured to prevent an object resting on the bottom from falling out of the internal receptacle through the opening during normal use of the vehicle.

13 Claims, 12 Drawing Sheets

(56) References Cited

U.S. PATENT DOCUMENTS

| | | | |
|---|---|---|---|
| 7,597,393 B1 | 10/2009 | Tuccinardi et al. | |
| 8,203,657 B2 * | 6/2012 | Vitito | B60K 35/00 |
| | | | 348/837 |
| 9,283,876 B2 * | 3/2016 | Dinger | B60N 2/80 |
| 2008/0272634 A1 | 11/2008 | Vasquez et al. | |
| 2017/0050545 A1 * | 2/2017 | Aguilar Ruelas | B60N 2/809 |

* cited by examiner

HEAD RESTRAINT WITH HIDDEN STORAGE RECEPTACLES

FIELD OF THE INVENTION

The present invention generally relates to head restraints employed as part of a seating assembly for a vehicle.

BACKGROUND OF THE INVENTION

Vehicles sometimes do not provide sufficient easily accessible storage capacity to occupants. In addition, the head restraints attached to the seatback of a vehicle sometimes take up more space that is necessary to serve its head restraint purpose, space that could be used to serve other purposes, such as providing storage area.

SUMMARY OF THE INVENTION

According to a first aspect of the present invention, a head restraint for a seating assembly of a vehicle comprises: an exterior surface; one or more interior wall surfaces disposed beneath the exterior surface forming an internal receptacle; an opening into the internal receptacle; the internal receptacle comprising a bottom; and the one or more interior wall surfaces are configured to prevent an object resting on the bottom from falling out of the internal receptacle through the opening during normal use of the vehicle.

Embodiments of the first aspect of the invention can include any one or a combination of the following features:
  the internal receptacle further comprises a top; the one or more interior wall surfaces comprise a first top edge disposed below the opening; and wherein the distance between the first top edge and the bottom of the internal receptacle is at least twenty percent of the distance between the top of the internal receptacle and the bottom of the internal receptacle;
  the head restraint further comprises: a rear; and the opening into the internal receptacle is at the rear;
  the head restraint further comprises: a first side; and the opening into the internal receptacle is at the first side;
  the head restraint further comprises: a second side; and a second opening into the internal receptacle at the second side; the one or more interior wall surfaces further comprise a second top edge disposed below the second opening; and wherein the distance between the second top edge and the bottom of the internal receptacle is at least twenty percent of the distance between the top of the internal receptacle and the bottom of the internal receptacle; and
  the head restraint further comprises: a separable portion having an unseparated position and a separated position; wherein, in the unseparated position, the separable portion covers the opening; and wherein, in the separated position, the separable portion does not cover the opening.

According to a second aspect of the present invention, a head restraint for a seating assembly of a vehicle comprises: a base portion; and a separable portion movably interconnected to the base portion; the separable portion comprises an internal receptacle and an opening into the internal receptacle, an unseparated position, and a separated position; wherein, when the separable portion is in the unseparated position, the internal receptacle is inaccessible; and wherein, when the separable portion is in the separated position, the internal receptacle is accessible.

Embodiments of the second aspect of the invention can include any one or a combination of the following features:
  the head restraint further comprises: a second separable portion movably interconnected to the base portion; the second separable portion comprises an internal receptacle and an opening into the internal receptacle, an unseparated position, and a separated position; wherein, when the second separable portion is in the unseparated position, the internal receptacle of the second separable portion is inaccessible; and wherein, when the second separable portion is in the separated position, the internal receptacle of the second separable portion is accessible;
  the base portion comprises a first side and a second side opposite the first side; wherein, the separable portion is movably interconnected to the base portion at the first side; and wherein, the second separable portion is movably interconnected to the base portion at the second side;
  the separable portion further comprises: an opening into the internal receptacle; a top; and a bottom; wherein the opening into the internal receptacle is disposed closer to the top than the bottom;
  the separable portion further comprises an opening into the internal receptacle, a top, and a bottom; wherein the opening into the internal receptacle of the separable portion is disposed closer to the top than the bottom; the second separable portion further comprises an opening into the internal receptacle, a top, and a bottom; wherein the opening into the internal receptacle of the second separable portion is disposed closer to the top than the bottom;
  the base portion further comprises a bottom; wherein the separable portion is pivotally interconnected to the base portion at or near the bottom of the base portion; and wherein the second separable portion is pivotally interconnected to the base portion at or near the bottom of the base portion; and
  the base portion further comprises an internal receptacle, a first opening to the internal receptacle at the first side, a second opening to the internal receptacle at the second side, a first wall at the first side extending vertically from the bottom to the first opening, a second wall at the second side extending vertically from the bottom to the second opening; wherein, when the separable portion is in the unseparated position, the separable portion covers the first opening, and when the separable portion is in the separated position, the separable portion does not cover the first opening; and wherein, when the second separable portion is in the unseparated position, the second separable portion covers the second opening, and when the second separable portion is in the separated position, the second separable portion does not cover the second opening.

According to a third aspect of the present invention, a head restraint for a seating assembly of a vehicle comprises: a base portion interconnected to a seatback; the base portion comprising a front, a rear, a first side, second side, and an internal receptacle accessible from either the first side or the second side.

Embodiments of the third aspect of the invention can include any one or a combination of the following features:
  the head restraint further comprises: a first separable portion movably interconnected to the base portion; the first separable portion having an unseparated position and a separated position; wherein, in the unseparated position, the internal receptacle is inaccessible from the first side; and wherein, in the separated position, the internal receptacle is accessible from the first side;

the first separable portion further comprises an internal receptacle; wherein, in the unseparated position, the internal receptacle of the first separable portion is inaccessible; and wherein, in the separated position, the internal receptacle of the first separable portion is accessible;

the head restraint further comprises: a second separable portion movably interconnected to the base portion; the second separable portion having an unseparated position and an separated position; wherein, when the second separable portion is in the unseparated position, the internal receptacle is inaccessible from the second side; and wherein, when the second separable portion is in the separated position, the internal receptacle of the base portion is accessible from the second side;

the second separable portion further comprises an internal receptacle; wherein, when the second separable portion is in the unseparated position, the internal receptacle of the second separable portion is inaccessible; and wherein, when the second separable portion is in the separated position, the internal receptacle of the second separable portion is accessible;

the internal receptacle of the base portion comprises a first wall with an outwardly facing surface that faces the first separable portion when the first separable portion is in the unseparated position; and the internal receptacle of the base portion is accessible above the first wall when the first separable portion is in the separated position;

the head restraint further comprises: a second separable portion movably interconnected to the base portion; the second separable portion having an unseparated position and a separated position; wherein, when the second separable portion is in the unseparated position, the internal receptacle of the base portion is inaccessible from the second side; wherein, when the second separable portion is in the separated position, the internal receptacle of the base portion is accessible from the second side; the second separable portion further comprising an internal receptacle; wherein, when the second separable portion is in the unseparated position, the internal receptacle of the second cover is inaccessible; and wherein, when the second separable portion is in the separated position, the internal receptacle of the second separable portion is accessible; the internal receptacle of the base portion further comprises a second wall with an outwardly facing surface facing the second separable portion when the second separable portion is in the unseparated position; and the internal receptacle of the base portion is accessible above the second wall when the second separable portion is in the separated position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
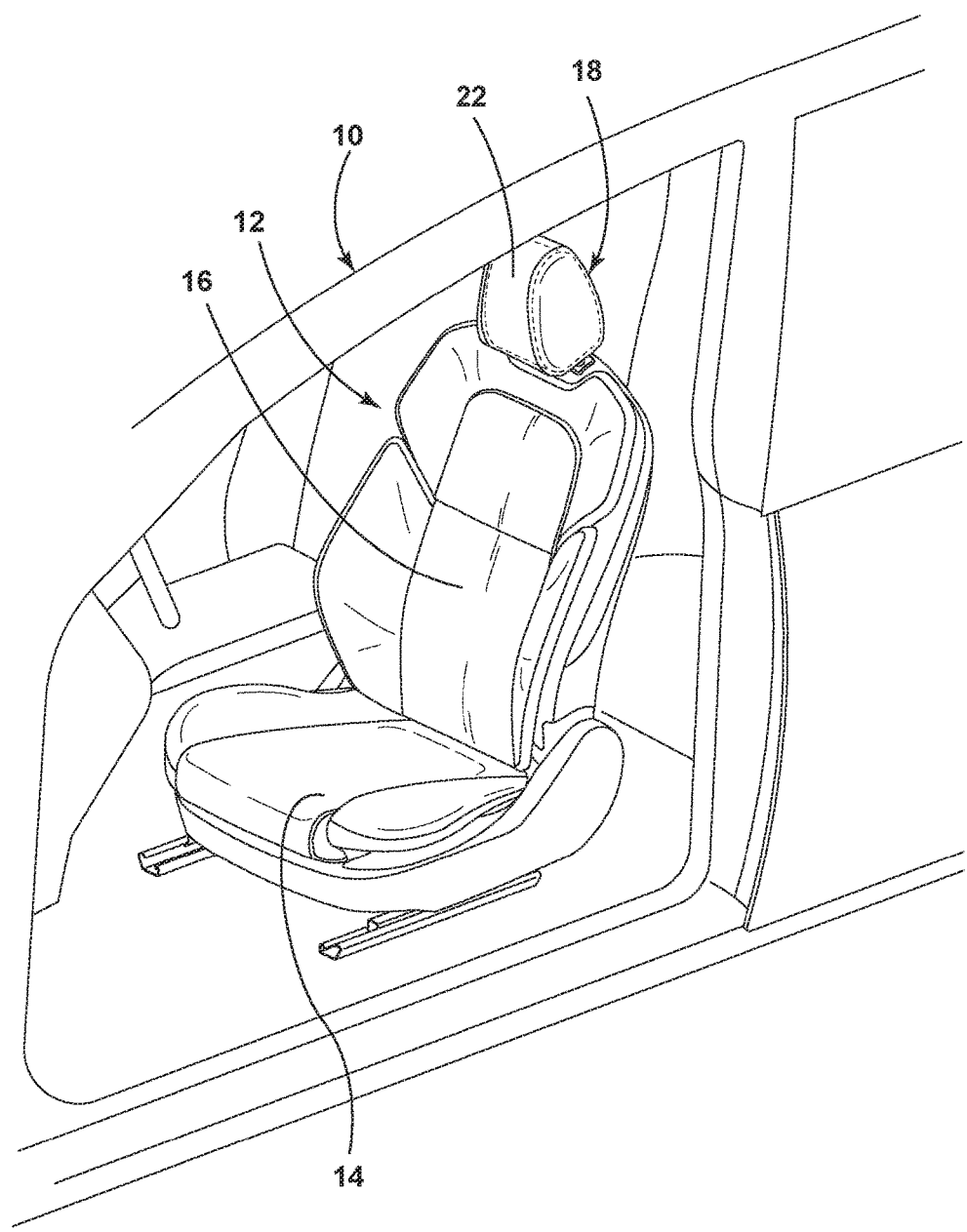
FIG. 1 is a side perspective view of the interior of a vehicle illustrating a seating assembly including an embodiment of a head restraint of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Referring now to FIG. 1, a vehicle 10 includes a seating assembly 12. The vehicle 10 is an automobile, which can be a car, truck, or van, among other things. The seating assembly 12 includes a seat 14, a seatback 16, and a head restraint 18 attached to the top of the seatback 16. The head restraint 18 is generally adjustable upwardly relative to the seatback 16, to help accommodate seat occupants of different heights. However, the head restraint 18 can be integrated as part of the seatback 16. A head restraint 18 is sometimes referred to as a headrest. The head restraint 18 limits the rearward movement of an occupant's head during a collision.

Figure 2:
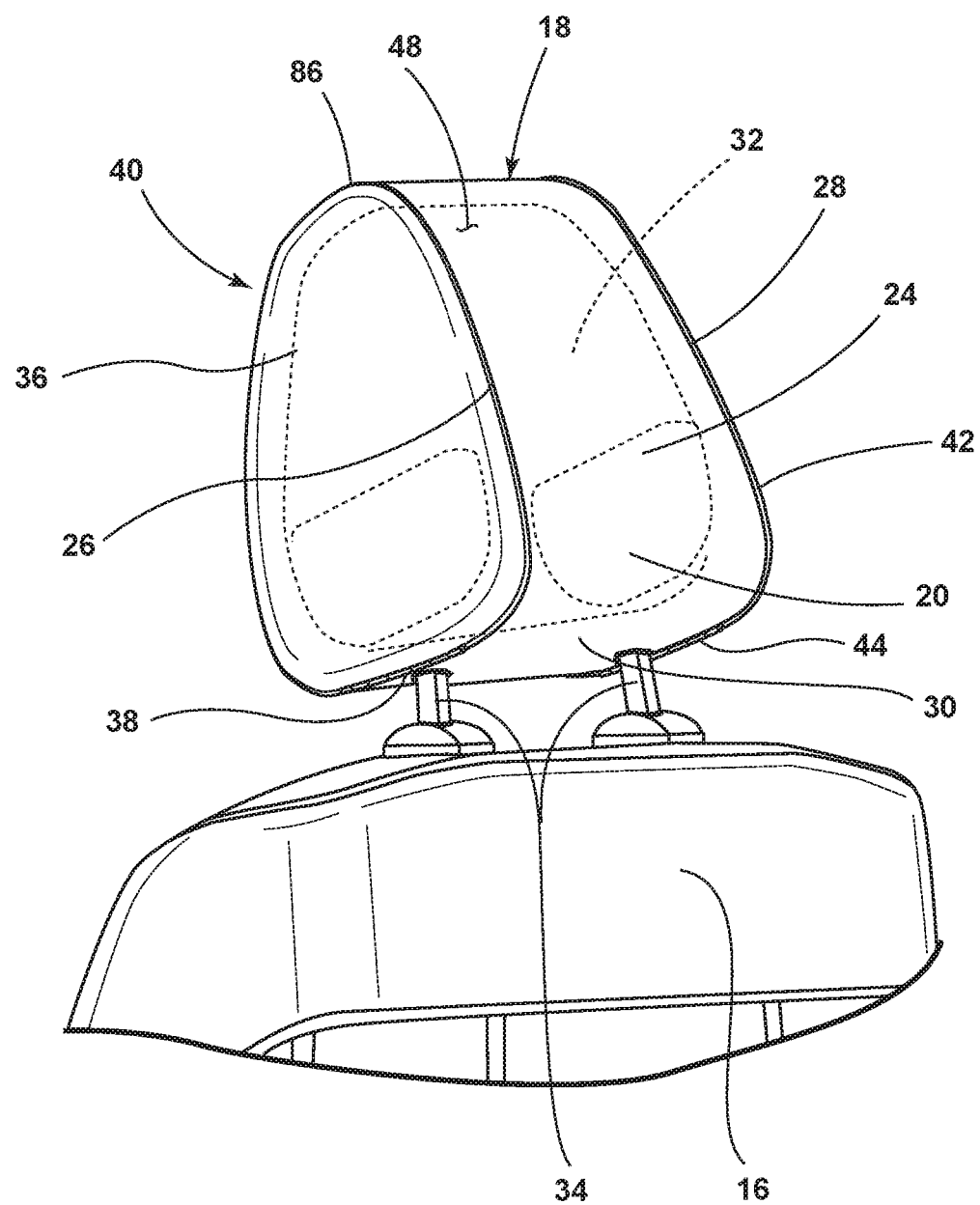
FIG. 2 is a perspective view from the side and rear of the head restraint of FIG. 1 attached to the seatback illustrating a base portion with a hidden internal receptacle in the base portion.
Figure 3:
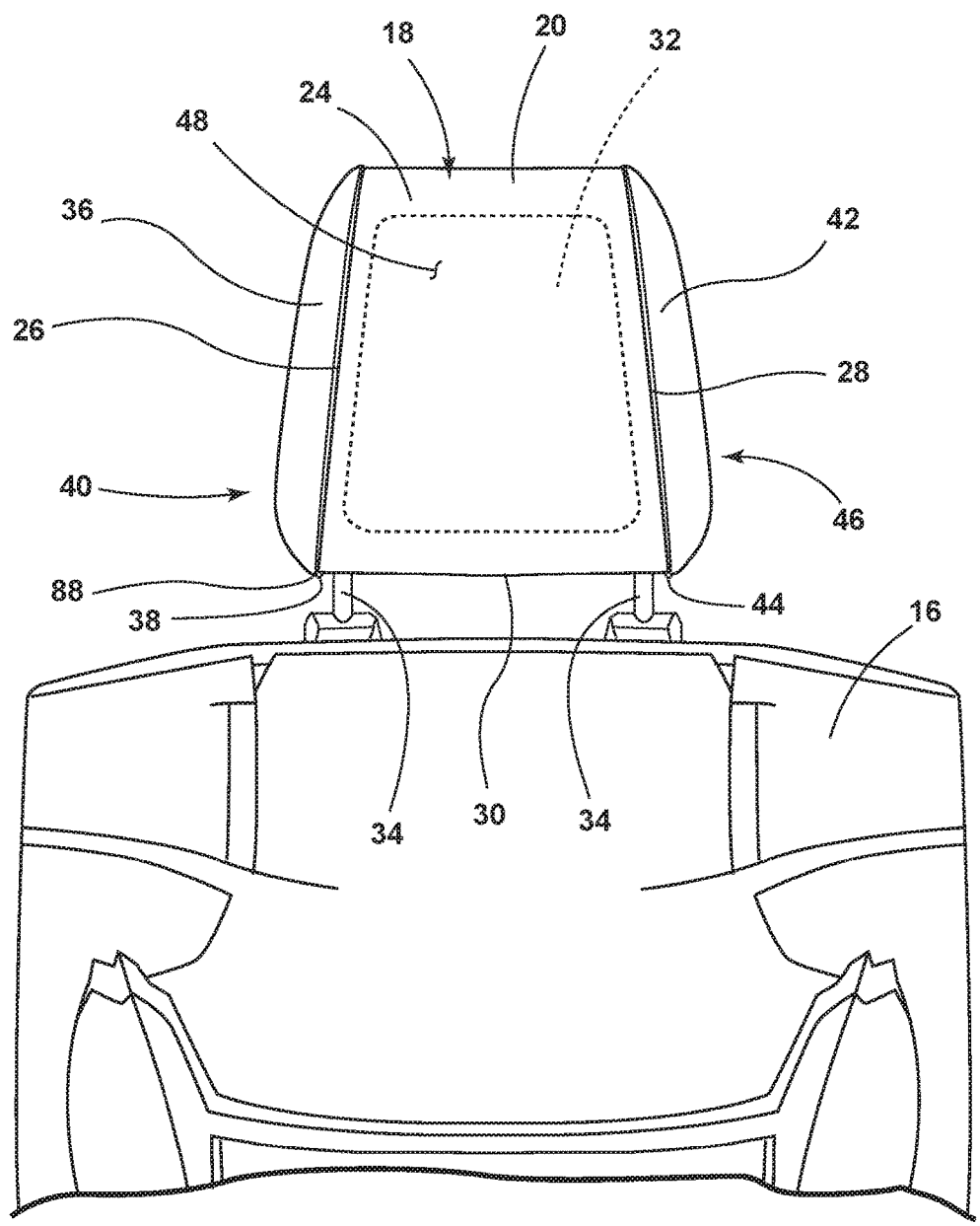
FIG. 3 is a rear view of the head restraint of FIG. 1 illustrating a first separable portion in an unseparated position and a second separable portion in an unseparated position, denying access to the internal receptacle of the base portion.

Referring now, generally, to FIGS. 2-7, the head restraint 18 includes a base portion 20 interconnected to a seatback 16. In the embodiment therein illustrated, the base portion 20 is movably interconnected to the seatback 16, allowing the head restraint 18 to adjust upwardly relative to the seatback 16. The base portion 20 has a front 22 (see FIG. 1), a rear 24 opposite the front 22, a first side 26, a second side 28 opposite the first side 26, a bottom 30, and an internal receptacle 32. The base portion 20 can include downwardly extending arms 34 that are received by matching apertures disposed within the seatback 16. The internal receptacle 32 can be accessible from either the first side 26 or the second side 28 or both the first side 26 and the second side 28 as it is in the embodiment illustrated herein. In this embodiment of the head restraint 18, the head restraint 18 further includes a first separable portion 36 located at the first side 26. The first separable portion 36 is movably interconnected to the base portion 20 at the first side 26. For example, in this embodiment the first separable portion 36 is pivotally interconnected to the base portion 20 at or near the bottom 30 of the base portion 20, such as with a hinge 38. The first separable portion 36 is illustrated in FIGS. 2 and 3 in an unseparated position 40, i.e., a closed position. In this embodiment of the head restraint 18, the head restraint 18 further includes a second separable portion 42 movably interconnected to the base portion 20 at the second side 28. For example, in this embodiment, the second separable portion 42 is pivotally interconnected to the base portion 20 at or near the bottom 30 of the base portion 20, such as with a hinge 44, which can be identical to hinge 38. There are many other ways to movably interconnect the first separable portion 36 and second separable portion 42 to the base portion 20, including male/female components. The second separable portion 42 is illustrated here in an unseparated position 46, i.e., a closed position.

As best illustrated in FIGS. 4-7, the head restraint 18, and more specifically for this embodiment, the base portion 20, includes an exterior surface 48 and one or more interior wall surfaces 50 disposed beneath the exterior surface 48 forming the internal receptacle 32, which is a partially enclosed chamber. The base portion 20 further includes a first opening 52 into the internal receptacle 32 at the first side 26, and a second opening 54 into the internal receptacle 32 at the second side 28. In these figures, the head restraint 18 is illustrated with the first separable portion 36 in a separated position 56, i.e., an open position. As mentioned, the first separable portion 36 has the unseparated position 40 and the separated position 56 and is capable of transitioning between the unseparated position 40 and the separated position 56 such as by pivoting about hinge 38. In the unseparated position 40, the internal receptacle 32 of the base portion 20 is inaccessible from the first side 26, because the first separable portion 36 covers the first opening 52. In other words, in the unseparated position 40, the first separable portion 36 blocks access through the first opening 52 into the internal receptacle 32 of the base portion 20. However, when the first separable portion 36 is in the separated position 56, the first opening 52 into the internal receptacle 32 of the base portion 20 is accessible from the first side 26. In other words, in the separated position 56, the first separable portion 36 does not cover the first opening 52 into the internal receptacle 32 of the base portion 20. Likewise, the second separable portion 42 is illustrated in these figures (FIGS. 4-7) in a separated position 58, i.e., opened position. The second separable portion 42 has the unseparated position 46 and the separated position 58 and is capable of transitioning between the unseparated position 46 and the separated position 58 such as by pivoting about hinge 44. When the second separable portion 42 is in the unseparated position 46, the internal receptacle 32 of the base portion 20 is inaccessible from the second side 28, because the second separable portion 42 covers the second opening 54. In other words, in the unseparated position 46, the second separable portion 42 blocks access through the second opening 54 into the internal receptacle 32 of the base portion 20. However, when the second separable portion 42 is in the separated position 58, the second opening 54 into the internal receptacle 32 of the base portion 20 is accessible from the second side 28. In other words, when the second separable portion 42 is in the separated position 58, the second separable portion 52 does not cover the second opening 54 into the internal receptacle 32 of the base portion 20.

The hinges 38, 44 can include a coil spring that is in a non-energized state when their respective first separable portion 36 and second separable portion 42 are in the unseparated position 40. When a user moves, for example, the first separable portion 36 to the separated position 56, the coil spring included with hinge 38 becomes energized. Thus, when the user releases the first separable portion 36, the coil spring forces the first separable portion 36 to return to the unseparated position 40. The coil spring included with hinge 44 can cause the second separable portion 42 to behave in the same manner described. In reference to FIGS. 4 and 6, the first separable portion 36 can include a latch 98 that can be received by aperture 100 within the base portion 20. Likewise, the second separable portion 42 can include a latch 102 that can be received by aperture 104 within the base portion 20. Latch 98 and latch 102 can be the push-to-lock and pull-to-open type of latch.

Figure 4:
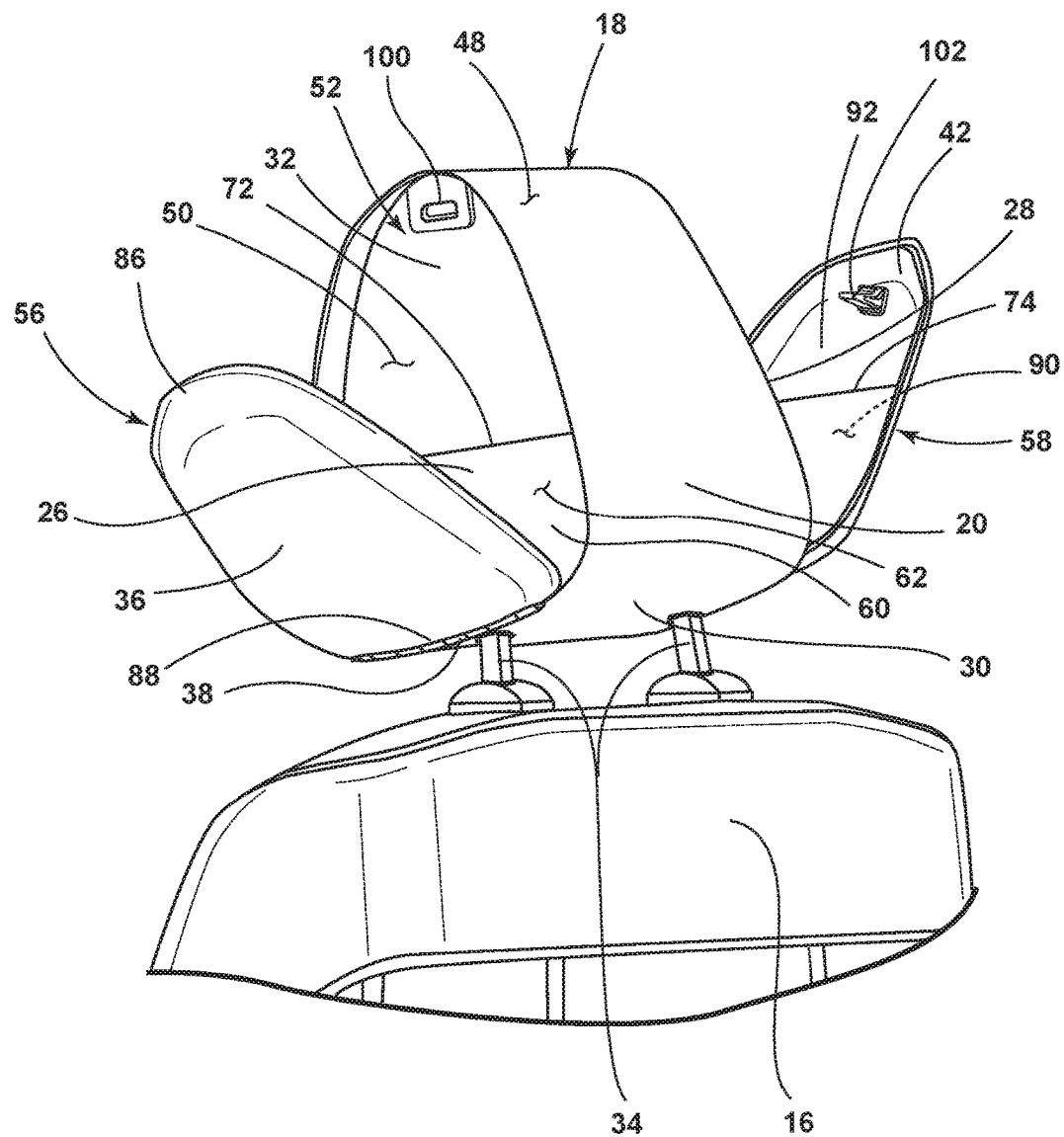
FIG. 4 is a perspective view from the side and rear of the head restraint of FIG. 1 illustrating the first separable portion in a separated position and the second separable portion in a separated position to allow access to the internal receptacle of the base portion.
Figure 5:
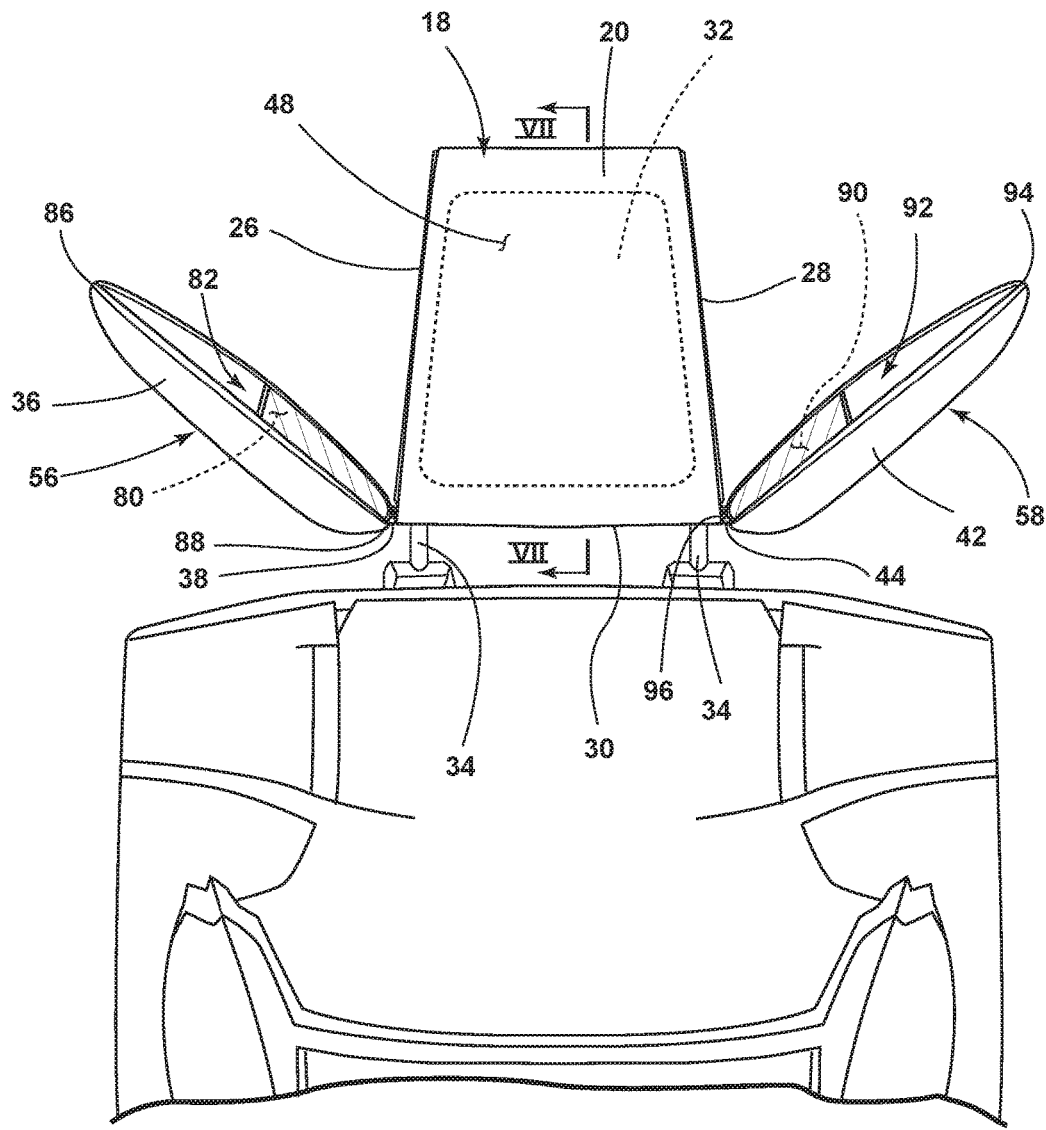
FIG. 5 is a rear view of the head restraint of FIG. 1 illustrating the first separable portion in a separated position and the second separable portion in a separated position.
Figure 7:
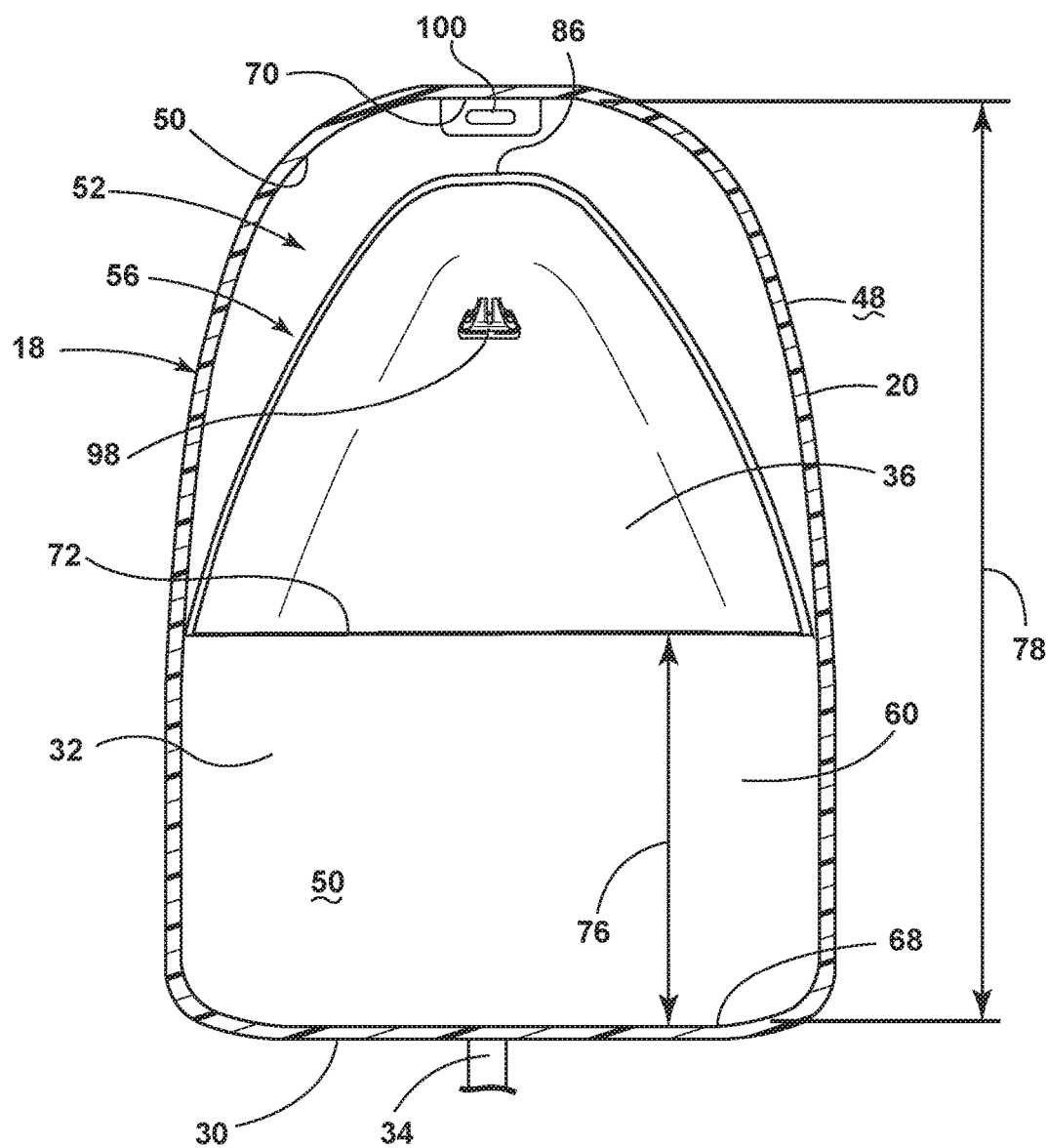
FIG. 7 is a side view of the head restraint of FIG. 1 taken at cross-section VII of FIG. 5 illustrating a first wall disposed below a first opening configured to retain an object within the internal receptacle.

As best illustrated in FIGS. 4 and 7, the internal receptacle 32 of the base portion 20 includes a first wall 60 at the first side 26. The first wall 60 extends vertically from the bottom 30 to the first opening 52. The first wall 60 has an outwardly facing surface 62. The outwardly facing surface 62 faces the first separable portion 36 when the first separable portion 36 is in the unseparated position 40. The internal receptacle 32 of the base portion 20 is accessible above the first wall 60, when the first separable portion 36 is in the separated position 56.

Figure 6:
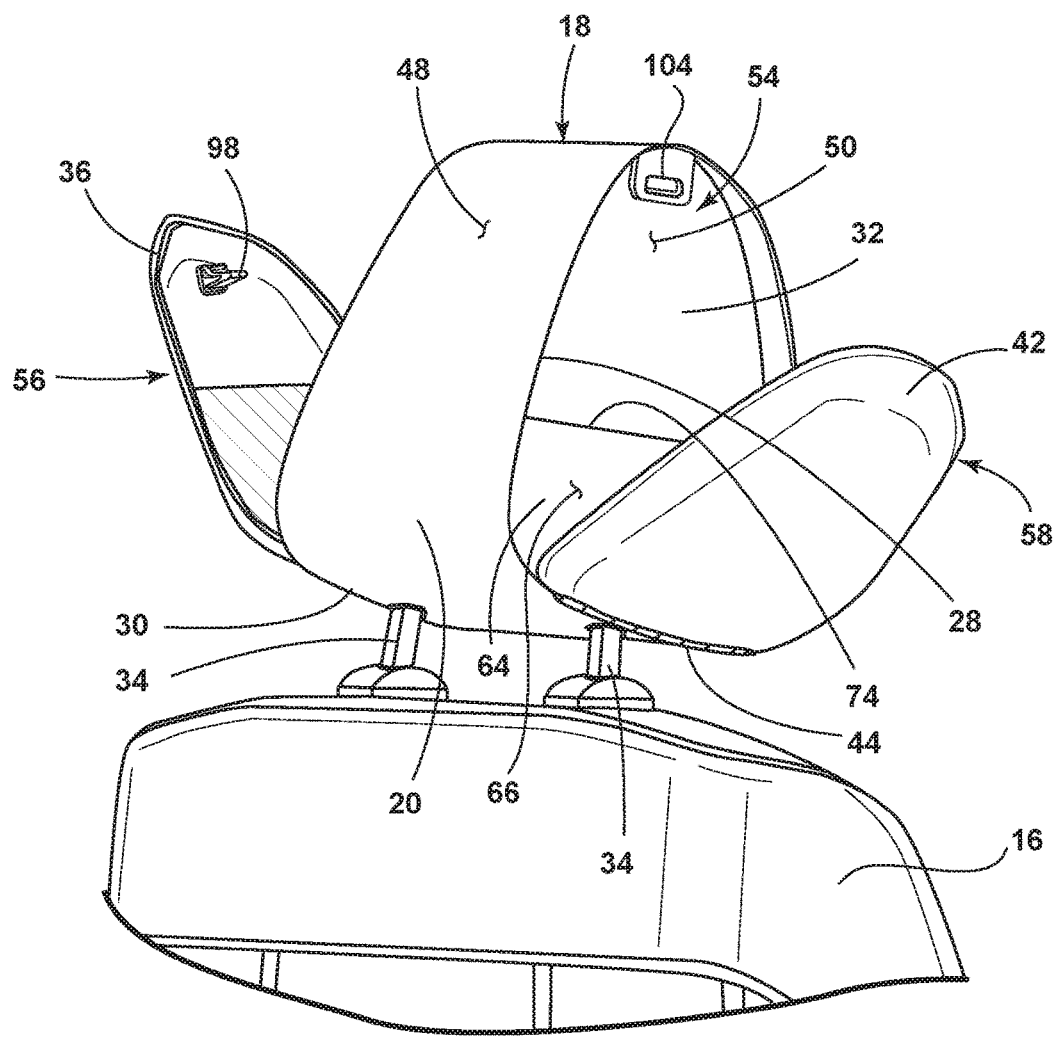
FIG. 6 is a perspective view from the side and rear of the head restraint of FIG. 1, viewed from the opposite side as that illustrated in FIG. 4.

As best illustrated in FIG. 6, the internal receptacle 32 of the base portion 20 further includes a second wall 64 at the second side 28. The second wall 64 extends vertically from the bottom 30 to the second opening 54. The second wall 64 has an outwardly facing surface 66. The outwardly facing surface 66 of the second wall 64 faces the second separable portion 42 when the second separable portion 42 is in the unseparated position 46 (see FIG. 3). The internal receptacle 32 of the base portion 20 is accessible above the second wall 64 when the second separable portion 42 is in the separated position 58.

As best illustrated in FIG. 7, the internal receptacle 32 of the base portion 20 includes a bottom 68 and a top 70. The one or more interior wall surfaces 50 has a first top edge 72 that is disposed below the first opening 52. The one or more interior wall surfaces 50 further has a second top edge 74 (see FIG. 6) that is disposed below the second opening 54. The one or more interior wall surfaces 50, including the interior wall surfaces 50 provided by the first wall 60 and the second wall 64, are configured to prevent an object resting on the bottom 68 of the internal receptacle 32 from falling out of the internal receptacle 32 through the first opening 52 or the second opening 54 during normal use of the vehicle 10. For example, the distance 76 between the first top edge 72 and the bottom 68 of the internal receptacle 32 is at least twenty percent of the distance 78 between the top 70 of the internal receptacle 32 and the bottom 68 of the internal receptacle 32 or at least approximately 1.5 inches, including approximately 4 inches. Likewise, the distance between the second top edge 74 and the bottom 68 of the internal receptacle 32 is at least twenty percent of the distance 78 between the top 70 of the internal receptacle 32 and the bottom 68 of the internal receptacle 32 or at least approximately 1.5 inches, including approximately 4 inches.

Figure 8:
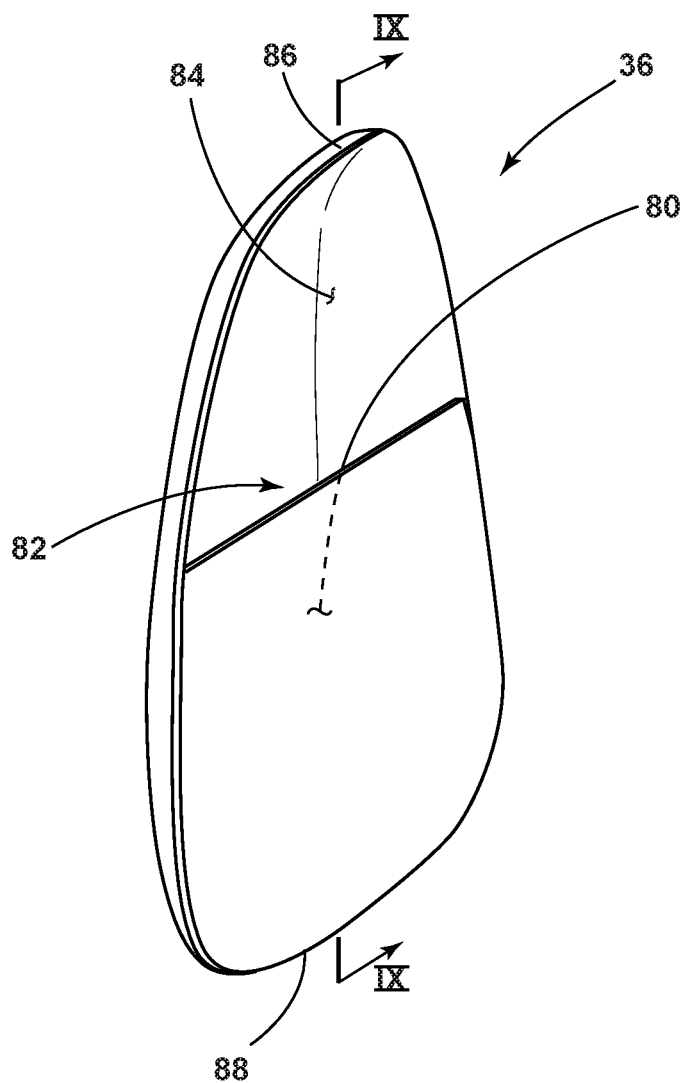
FIG. 8 is a perspective view of the first separable portion of FIGS. 1-7 illustrating an internal receptacle.
Figure 9:
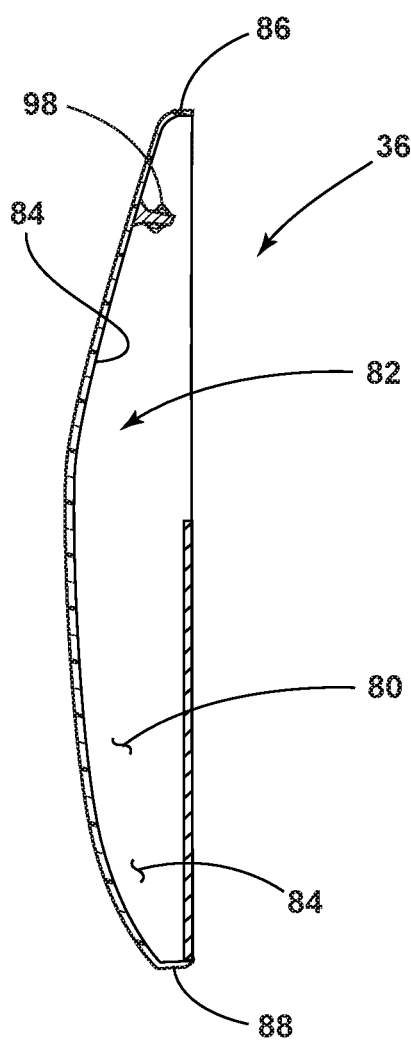
FIG. 9 is a side view of the first separable portion of FIG. 8 taken at cross-section IX.

Referring now to FIGS. 8 and 9, the first separable portion 36 can further include an internal receptacle 80 and an opening 82 into the internal receptacle 80. The internal receptacle 80 of the first separable portion 36 is formed by one or more internal surfaces 84 forming a partially enclosed chamber. The first separable portion 36 further comprises a top 86 and a bottom 88. The opening 82 into the internal receptacle 80 of the first separable portion 36 is disposed closer to the top 86 than to the bottom 88. When the first separable portion 36 is in the unseparated position 40, the internal receptacle 80 of the first separable portion 36 is inaccessible (see FIGS. 2 and 3). However, when the first separable portion 36 is in the separated position 56, the internal receptacle 80 of the first separable portion 36 is accessible (see FIGS. 4-6). It should be understood that the second separable portion 42 can likewise further include an internal receptacle 90 and an opening 92 into the internal receptacle 90 (see FIGS. 4 and 5). The internal receptacle 90 of the second separable portion 42 is likewise formed by one or more internal surfaces forming a partially enclosed chamber. When the second separable portion 42 is in the unseparated position 46, the internal receptacle 32 of the second separable portion 42 is inaccessible (see FIGS. 2 and 3). However, when the second separable portion 42 is in the separated position 58, the internal receptacle 32 of the second separable portion 42 is accessible (see FIGS. 4-6). The second separable portion 42 further comprises a top 94 and a bottom 96 (see FIG. 5). The opening 92 into the internal receptacle 90 of the second separable portion 42 is disposed closer to the top 94 than to the bottom 96. The embodiment of the head restraint 18 illustrated in FIGS. 1-9 thus includes three different internal receptacles that can be used as hidden but accessible storage areas.

Figure 10:
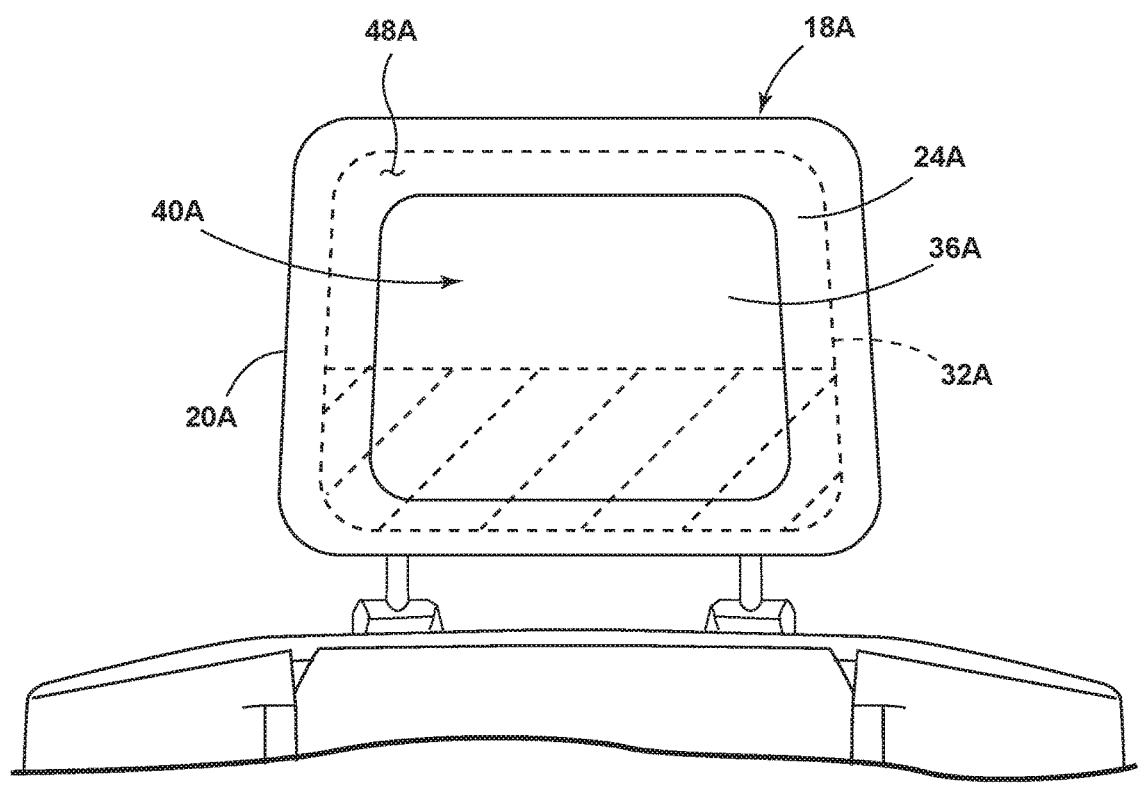
FIG. 10 is a rear view of another embodiment of a head restraint of the present disclosure with a hidden internal receptacle and a separable portion covering the opening into the internal receptacle disposed at the rear of the head restraint.
Figure 11:
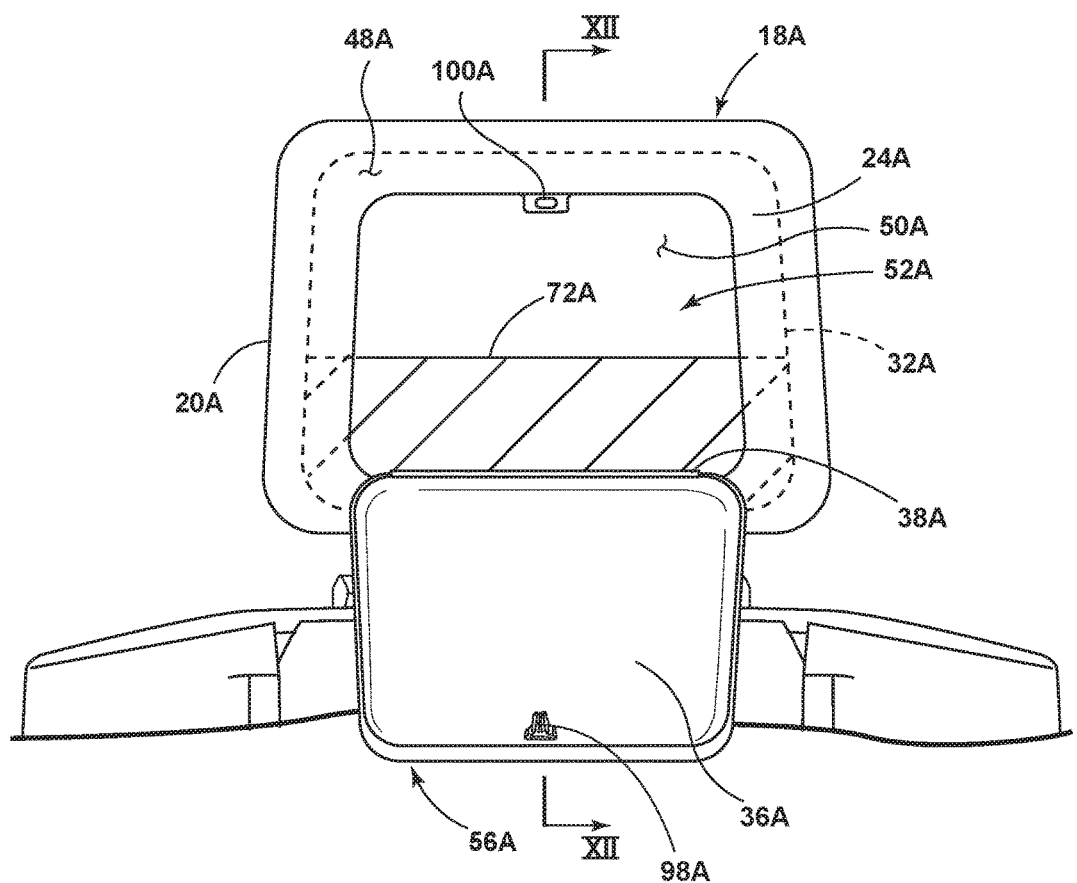
FIG. 11 is a rear view of the head restraint of FIG. 10 illustrating the separable portion in an open position.
Figure 12:
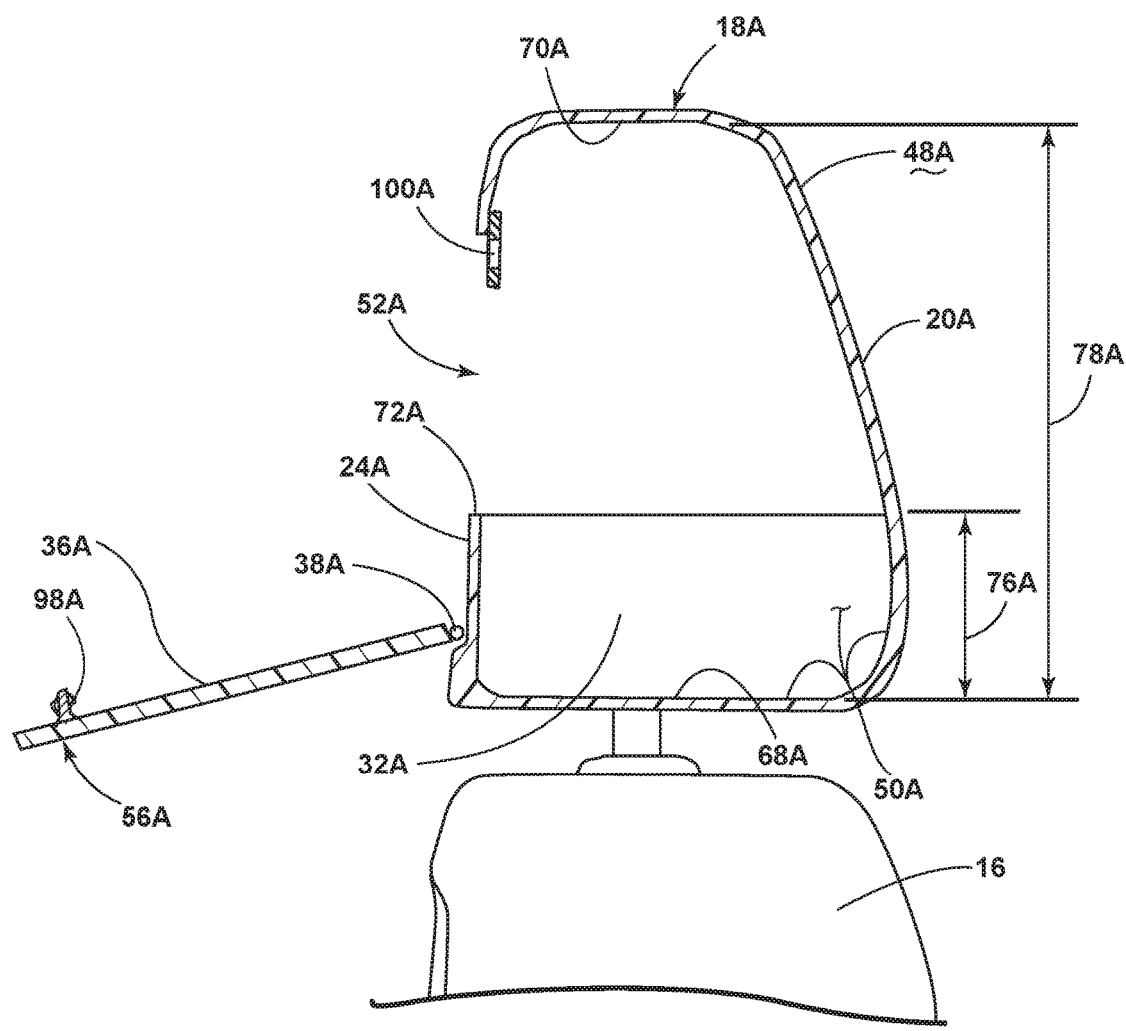
FIG. 12 is a side view of the head restraint of FIG. 10 taken at cross-section XII of FIG. 11 illustrating a wall disposed below an opening configured to retain an object within the internal receptacle.

Referring now to FIGS. 10-12, another embodiment of a head restraint 18A for the seating assembly 12 of the vehicle 10 is illustrated. In this embodiment, the head restraint 18A again comprises an exterior surface 48A, and one or more interior wall surfaces 50A disposed beneath the exterior surface 48A forming an internal receptacle 32A. The head restraint 18A includes an opening 52A into the internal receptacle 32A at the rear 24A. The internal receptacle 32A has a bottom 68A and a top 70A. The interior wall surfaces 50A are configured to prevent an object resting on the bottom 68A from falling out of the internal receptacle 32A through the opening 52A during normal use of the vehicle 10. For example, one or more interior wall surfaces 50A include a top edge 72A disposed below the opening 52A. The distance 76A between the top edge 72A and the bottom 68A of the internal receptacle 32A is at least twenty percent of the distance 78A between the top 70A of the internal receptacle 32A and the bottom 68A of the internal receptacle 32A or at least approximately 1.5 inches, including approximately 4 inches. A separable portion 36A is movably interconnected to a base portion 20A, such as via a hinge 38A. The separable portion 36A can transition between an unseparated position 40A and a separated position 56A. In the unseparated position 40A, the separable portion 36A prevents access through the opening 52A into the internal receptacle 32A because the separable portion 36A covers the opening 52A. In the separated position 56A, the separable portion 36 does not prevent access through the opening 52A into the internal receptacle 32A because the separable portion 36A does not cover the opening 52A. The separable portion 36A can likewise include an external receptacle in the same manner as first separable portion 36 does in the embodiment disclosed above. Hinge 38A likewise can include a spring coil as described above. Latch 98A operably interacts with matching aperture 100A, in the same manner as described above for latch 98 and aperture 100.

In use, an occupant can easily access the internal receptacles 32, 80, 90, 32A disclosed herein as part of a head restraint 18, 18A to store items. For example, an occupant can move the first separable portion 36 from the unseparated position 40 to the separated position 56 and place an item such as a smart phone through the first opening 52 into the internal receptacle 32 of the base portion 20 and an item such as a set of keys or a wallet through the opening 82 into the internal receptacle 80 of the first separable portion 36. The occupant can then move the first separable portion 36 back to the unseparated position 40. The items are now stored within the head restraint 18 and the head restraint 18 is serving a purpose in addition to the purpose of restraining the head of the occupant of the seat 14 to which the head restraint 18 is interconnected and adds storage capacity to the limited storage capacity of a vehicle 10. Moreover, when the occupant wants to retrieve the stored items, the occupant can move the first separable portion 36 again to the separated position 56. Because the interior wall surfaces 50 of the internal receptacle 32 are configured to prevent the objects retained within the internal receptacle 32 from falling out of the internal receptacle 32 through the first opening 52, such as with a sufficiently high first wall 60, the occupant's smart phone will not fall out of the internal receptacle 32 when the occupant moves the first separable portion 36 to the separated position 56.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A head restraint for a seating assembly of a vehicle comprising:
    a first side;
    an exterior surface;
    one or more interior wall surfaces disposed beneath the exterior surface forming an internal receptacle;
    an opening into the internal receptacle disposed at the first side;
    the internal receptacle comprising a top and a bottom; and
    the one or more interior wall surfaces comprising a first top edge disposed below the opening, with a distance between the first top edge and the bottom of the internal receptacle that is at least twenty percent of a distance between the top of the internal receptacle and the bottom of the internal receptacle.

2. The head restraint for a seating assembly of a vehicle of claim 1 further comprising:
    a second side; and
    a second opening into the internal receptacle at the second side;

the one or more interior wall surfaces further comprising a second top edge disposed below the second opening with a distance between the second top edge and the bottom of the internal receptacle that is at least twenty percent of the distance between the top of the internal receptacle and the bottom of the internal receptacle.

3. The head restraint for a seating assembly of a vehicle of claim 2 further comprising:
a separable portion having an unseparated position, where the separable portion covers the opening, and a separated position, where the separable portion does not cover the opening; and
a second separable portion having an unseparated position, where the second separable portion covers the second opening, and a separated position, where the second separable portion does not cover the second opening.

4. The head restraint for a seating assembly of a vehicle of claim 1 further comprising:
a separable portion having an unseparated position, where the separable portion covers the opening, and a separated position, where the separable portion does not cover the opening.

5. A head restraint for a seating assembly of a vehicle comprising:
a base portion; and
a first separable portion and a second separable portion movably interconnected to the base portion;
the first separable portion and the second separable portion each comprising:
an internal receptacle and an opening into the internal receptacle;
an unseparated position, where the internal receptacle is inaccessible; and
a separated position, where the internal receptacle is accessible.

6. The head restraint for a seating assembly of a vehicle of claim 5,
the base portion comprising a first side and a second side opposite the first side;
the first separable portion is movably interconnected to the base portion at the first side; and
the second separable portion is movably interconnected to the base portion at the second side.

7. The head restraint for a seating assembly of a vehicle of claim 5,
the first separable portion and the second separable portion each further comprising:
a top; and
a bottom, with
the opening into the internal receptacle being disposed closer to the top than the bottom.

8. The head restraint for a seating assembly of a vehicle of claim 5,
the base portion further comprising a bottom;
the first separable portion is pivotally interconnected to the base portion at or near the bottom of the base portion; and
the second separable portion is pivotally interconnected to the base portion at or near the bottom of the base portion.

9. The head restraint for a seating assembly of a vehicle of claim 5,
the base portion further comprising:
an internal receptacle;
a first opening to the internal receptacle at a first side;
a second opening to the internal receptacle at a second side;
a first wall at the first side extending vertically from the bottom to the first opening;
a second wall at the second side extending vertically from the bottom to the second opening;
when the first separable portion is in the unseparated position, the first separable portion covers the first opening to the internal receptacle of the base portion, and when the first separable portion is in the separated position, the first separable portion does not cover the first opening to the internal receptacle of the base portion; and
when the second separable portion is in the unseparated position, the second separable portion covers the second opening to the internal receptacle of the base portion, and when the second separable portion is in the separated position, the second separable portion does not cover the second opening to the internal receptacle of the base portion.

10. A head restraint for a seating assembly of a vehicle comprising:
a base portion interconnected to a seatback, the base portion comprising a front, a rear, a first side, second side, and an internal receptacle accessible via a first opening disposed at the first side; and
a first separable portion disposed at the first side that is movably interconnected to the base portion, the first separable portion also comprising:
an internal receptacle;
a separated position, where both the internal receptacle of the base portion and the internal receptacle of the first separable portion are accessible; and
an unseparated position, where both the internal receptacle of the base portion and the internal receptacle of the first separable portion are inaccessible.

11. The head restraint for a seating assembly of a vehicle of claim 10, the internal receptacle of the base portion further accessible via a second opening disposed at the second side,
the head restraint further comprising
a second separable portion disposed at the second side that is movably interconnected to the base portion, the second separable portion also comprising:
an internal receptacle;
a separated position, where both the internal receptacle of the base portion and the internal receptacle of the second separable portion are accessible; and
an unseparated position, where both the internal receptacle of the base portion and the internal receptacle of the second separable portion are inaccessible.

12. The head restraint for a seating assembly of a vehicle of claim 11,
the internal receptacle of the base portion comprises a first wall disposed below the first opening with an outwardly facing surface that faces the first separable portion when the first separable portion is in the unseparated position;
the internal receptacle of the base portion is accessible via the first opening above the first wall when the first separable portion is in the separated position;
the internal receptacle of the base portion further comprises a second wall disposed below the second opening with an outwardly facing surface facing the second separable portion when the second separable portion is in the unseparated position; and the internal receptacle of the base portion is accessible via the second opening above the second wall when the second separable portion is in the separated position.

13. The head restraint for a seating assembly of a vehicle of claim 10, the internal receptacle of the base portion comprises a first wall disposed below the first opening with an outwardly facing surface that faces the first separable portion when the first separable portion is in the unseparated position; and the internal receptacle of the base portion is accessible via the first opening above the first wall when the first separable portion is in the separated position.

\* \* \* \* \*